US010765242B2

(12) United States Patent
Cook et al.

(10) Patent No.: US 10,765,242 B2
(45) Date of Patent: Sep. 8, 2020

(54) DISPENSING SYSTEM AND METHOD OF MAKING AND USING THE SAME

(71) Applicant: CRYOVAC, LLC, Charlotte, NC (US)

(72) Inventors: Hubert Cook, Simpsonville, SC (US); David Ackerman, Greenville, SC (US); Steve Schwarz, Moore, SC (US); Edward Jones, Greenville, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/340,432

(22) PCT Filed: Oct. 18, 2017

(86) PCT No.: PCT/US2017/057168
§ 371 (c)(1),
(2) Date: Apr. 9, 2019

(87) PCT Pub. No.: WO2018/075629
PCT Pub. Date: Apr. 26, 2018

(65) Prior Publication Data

US 2019/0246821 A1 Aug. 15, 2019

Related U.S. Application Data

(60) Provisional application No. 62/468,405, filed on Mar. 8, 2017, provisional application No. 62/410,128, filed on Oct. 19, 2016.

(51) Int. Cl.
*A47G 19/18* (2006.01)
*B65D 83/00* (2006.01)
(Continued)

(52) U.S. Cl.
CPC ...... *A47G 19/183* (2013.01); *B05C 17/00576* (2013.01); *B05C 17/01* (2013.01);
(Continued)

(58) Field of Classification Search
CPC .................. A47G 19/183; B05C 17/01; B05C 17/00576; B65D 83/0072; B65D 83/0033; B65D 2231/001; B65D 83/0005
See application file for complete search history.

(56) References Cited

U.S. PATENT DOCUMENTS 3,920,156 A 11/1975 Hicks
4,546,767 A * 10/1985 Smith ................ A61B 17/8811 604/224

(Continued)

FOREIGN PATENT DOCUMENTS

DE 3714138 A1 1/1988
EP 669267 * 8/1955 ......... B65D 83/0072

(Continued)

*Primary Examiner* — David P Angwin
*Assistant Examiner* — Bob Zadeh
(74) *Attorney, Agent, or Firm* — Jon M. Isaacson

(57) ABSTRACT

A dispenser includes a body (10) the body including an asymmetric shape corresponding to a flattened product pouch. The body includes a row of teeth (42) extending longitudinally along the bottom of the body. A grip (28) is slidingly engaged with a bottom of the body and is coupled to a squeeze pusher (32) disposed within the interior space of the body. An actuator arm (30) is movably attached to the grip. A drive mechanism is movably attached to the actuator and is engageable with the row of teeth. For dispensing, movement of the actuator causes a corresponding movement of the drive mechanism which causes the grip and squeeze pusher to move relative to the body in a direction from the proximal end to the dispensing end, thus applying pressure to the pouch.

5 Claims, 13 Drawing Sheets

(51) Int. Cl.
*B05C 17/005* (2006.01)
*B05C 17/01* (2006.01)

(52) U.S. Cl.
CPC ..... *B65D 83/0005* (2013.01); *B65D 83/0033* (2013.01); *B65D 83/0072* (2013.01); *B65D 2231/001* (2013.01)

(56) References Cited

U.S. PATENT DOCUMENTS

| | | | | | |
|---|---|---|---|---|---|
| 5,330,074 | A * | 7/1994 | Wirsig | B05C 17/00583 | 222/325 |
| 5,356,037 | A * | 10/1994 | Harrold | B65D 83/0005 | 222/105 |
| 6,260,737 | B1 * | 7/2001 | Gruendeman | B05C 17/01 | 222/391 |
| 6,938,799 | B1 | 9/2005 | Berntsen et al. | | |
| 2007/0023456 | A1 * | 2/2007 | Jalali | A23G 3/28 | 222/391 |
| 2007/0215649 | A1 * | 9/2007 | Tirone | A23G 3/2015 | 222/391 |
| 2008/0006654 | A1 * | 1/2008 | Lampe | B05C 17/0106 | 222/80 |
| 2009/0159613 | A1 * | 6/2009 | Rusch | B65D 83/0072 | 222/95 |
| 2011/0168742 | A1 * | 7/2011 | Veltrop | B05C 17/0113 | 222/392 |
| 2014/0054327 | A1 | 2/2014 | Veltrop et al. | | |
| 2019/0246821 | A1 * | 8/2019 | Cook | A47G 19/183 | |

FOREIGN PATENT DOCUMENTS

| | | | |
|---|---|---|---|
| GB | 2171462 | A | 8/1986 |
| JP | 5657092 | B1 | 1/2015 |
| WO | 2004062393 | A2 | 7/2004 |

* cited by examiner

DISPENSING SYSTEM AND METHOD OF MAKING AND USING THE SAME

FIELD OF THE INVENTION

The presently disclosed subject matter relates generally to a system for dispensing a packaged product. As set forth in more detail herein below, the disclosed packaging system includes an outer container and an inner flexible package comprising a frangible seal. Methods of making and using the disclosed system are also included within the scope of the presently disclosed subject matter.

BACKGROUND

In food service, and in particular in the field of high volume fast food service, it is frequently desired that food be supplemented by condiments such as ketchup, mustard, mayonnaise, and the like. It has recently become customary in retail fast service chain food outlets to use a wide variety of devices to dispense a measured quantity of flowable product. For example, a conventional, trigger-activated dispensing gun assembly has commonly been used in "back of the restaurant" operations for discharging one or more condiments or sauces. The gun assembly dispenses a quantity of a condiment with each pull of a gun trigger. The conventional gun assembly includes a cylindrical container that houses the condiment and cooperates with a trigger in a gun to dispense the condiment out of a nozzle. However, the gun, cylindrical container, and nozzle are typically disassembled and cleaned each time the container is emptied and refilled. In addition, the conventional gun assembly typically can be messy, as condiment can drip from the nozzle between uses. Furthermore, the rod portion of the dispensing gun is cumbersome and problematic for users.

Therefore, it would be beneficial to provide a dispensing system that addresses the shortcomings in the prior art.

SUMMARY

Embodiments of the presently disclosed subject matter are directed to a dispenser including a body comprising a proximal end and a dispensing end and opposed sides and an opposed top and bottom defining an interior space. The body may include an asymmetric shape corresponding to a shape of a pouch. That is, a distance between the sides may be smaller than a distance between the top and bottom of the body. The body further includes a row of teeth extending longitudinally along the bottom of the body extending from the proximal end to the dispensing end. The dispenser also includes a grip slidingly engaged with a bottom of the body and a squeeze pusher disposed within the interior space of the body. The squeeze pusher may be coupled to the grip and slidable within the interior space. An actuator arm can be movably attached to the grip and biased to a home position away from the grip. To dispense the product, the actuator arm is movable from the home position towards the grip. The dispenser may also include a driver pawl that is movably attached to the actuator and engageable with the row of teeth. The dispenser may also include a retainer pawl that is movably attached to the grip and also engageable with the row of teeth. When the actuator is moved from the home position towards the grip, the retainer pawl disengages from the row of teeth while the driver pawl remains engaged with the row of teeth. The movement of the actuator may cause a corresponding movement of the driver pawl which causes the grip and squeeze pusher to move relative to the body in a direction from the proximal end to the dispensing end.

After actuation to dispense product, the actuator is allowed to move back to the home position away from the grip. As the actuator moves back to the home position, the retainer pawl engages with the row of teeth to prevent the grip and squeeze pusher to move relative to the body in a direction from the dispensing end to the proximal end. Moreover, the driver pawl disengages from the row of teeth and moves to a new location where the driver pawl reengages the row of teeth.

The dispenser may be used to dispense product from a pouch filled with the product to be dispensed. The pouch is disposed within the interior space of the body and may include a flattened shape corresponding to the asymmetric shape of the dispenser body. The pouch may further comprise a spout for dispensing product at a first end and a seal at an opposite second end. Once installed in the dispenser, the second end of the pouch may be secured to the proximal end of the body and the spout may be disposed towards the dispensing end of the body. With each actuation, when the squeeze pusher moves relative to the body in the direction from the proximal end to the dispensing end, the squeeze pusher slides along the exterior of the pouch to apply pressure to the pouch and cause the product to exit the spout.

In another embodiment, a dispenser may be used to dispense product from a pouch filled with the product to be dispensed, the pouch disposed within the interior space of the body and including a flattened shape corresponding to the asymmetric shape of the dispenser body. The pouch may further comprise a spout for dispensing product at a first end and a seal at an opposite second end. The second end of the pouch may be positioned towards the proximal end of the body and the spout may be positioned to pass through the aperture. When the squeeze pusher moves relative to the body in the direction from the proximal end to the dispensing end, the squeeze pusher applies pressure to the pouch and causes the product to exit the spout.

In another embodiment, a dispenser is adapted to dispense condiment from a condiment-filled pouch, the pouch having an elongated shape and a spout at a dispensing end of the pouch. The dispenser may comprise a body comprising a proximal end, a dispensing end, opposed sides, and an opposed top and bottom defining an interior space, the interior space including an asymmetric shape wherein a height between the top and bottom is at least two times a width between the sides. The body may also comprise a spout aperture at the dispensing end, the spout aperture including a restrictor. The dispenser may comprise a squeeze pusher slidably disposed within the interior space of the body and an actuator operably coupled to the squeeze pusher and configured so that individual actuations of the actuator cause a corresponding sliding movement of the squeeze pusher relative to the body in a direction from the proximal end to the dispensing end.

In another embodiment, a dispenser is adapted to dispense condiment from a condiment-filled pouch, the pouch having an elongated shape and a spout at a dispensing end of the pouch. The dispenser may comprise a body comprising a proximal end, a dispensing end, opposed sides, and an opposed top and bottom defining an interior space, the interior space including an asymmetric shape wherein a height between the top and bottom is at least two times a width between the sides. The body may also comprise a spout aperture at the dispensing end, the spout aperture including a restrictor. The dispenser may further comprise a row of teeth extending longitudinally along the body from the proximal end to the dispensing end, a grip slidingly engaged with the body, a squeeze pusher disposed within the interior space of the body, the squeeze pusher coupled to the grip and slidable within the interior space, an actuator movably attached to the grip and biased to a home position away from the grip and movable from the home position towards the grip, a drive mechanism coupled to the actuator and engageable with the row of teeth, and a retainer pawl movably attached to the grip and also engageable with the row of teeth. When the actuator is moved from the home position towards the grip, the retainer pawl disengages from the row of teeth while the drive mechanism remains engaged with the row of teeth, the movement of the actuator causes a corresponding movement of the drive mechanism which causes the grip and squeeze pusher to move relative to the body in a direction from the proximal end to the dispensing end.

DETAILED DESCRIPTION

I. General Considerations

Figure 1A:
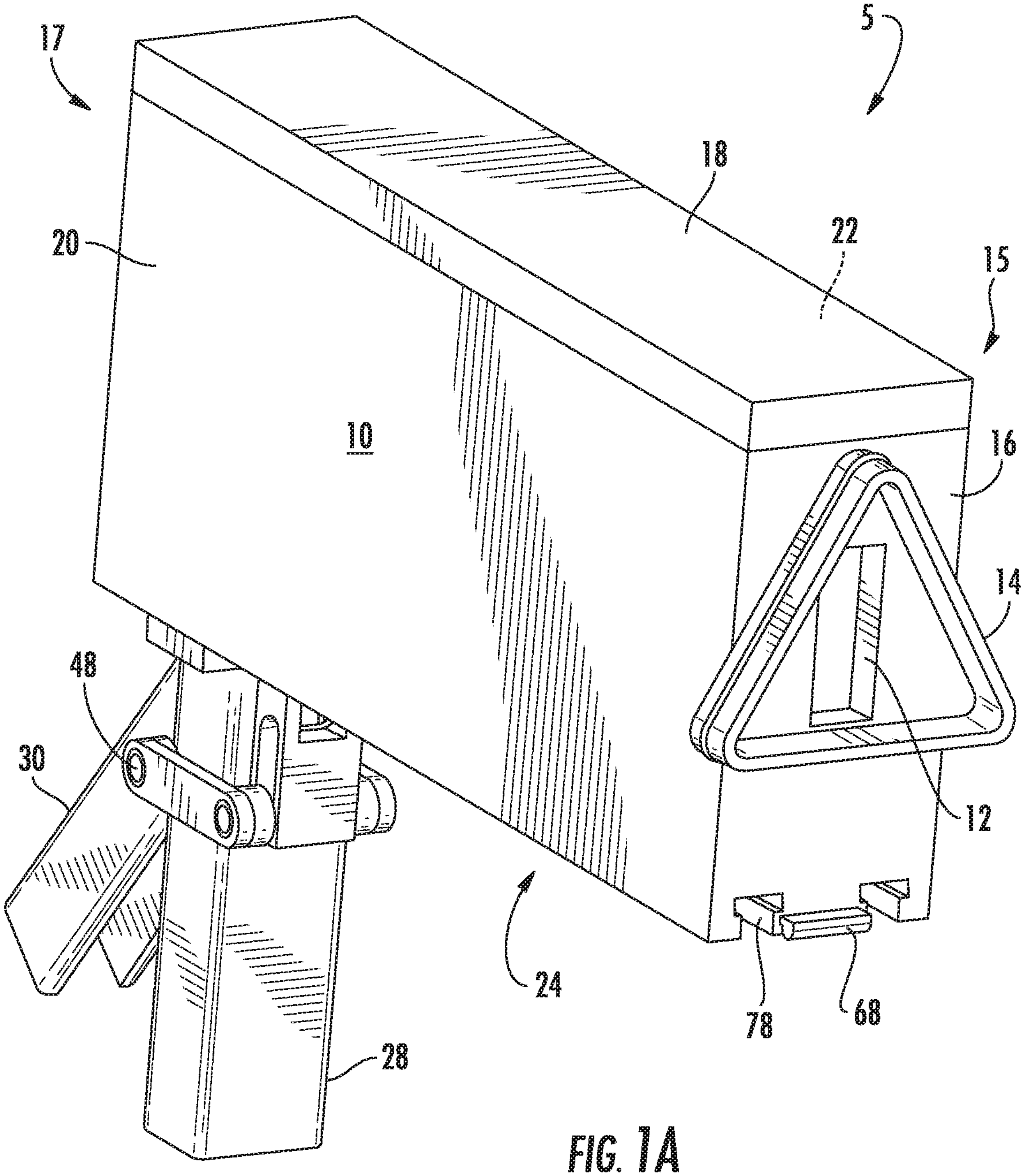
FIG. 1A is an isometric view of a dispenser without an optional discharge unit in accordance with some embodiments of the presently disclosed subject matter.

The presently disclosed subject matter provides a dispensing system and method for dispensing a product onto one or more areas (one or more spots of mustard dispensed on a hamburger bun, for example). As set forth in more detail herein, the disclosed packaging system includes a dispenser comprising an asymmetric body with an interior that is shaped in roughly the same or similar aspect ratio as a pouch housing a product to be dispensed.

II. Definitions

Following long standing patent law convention, the terms "a", "an", and "the" refer to "one or more" when used in the subject application, including the claims. Thus, for example, reference to "a film" includes a plurality of such films, and so forth.

The term "condiment" as used herein refers to (but is not limited to) sauces, salad dressing, emulsions, frosting, icing, ketchup, mustard, guacamole, sour cream, salsa, nacho cheese, taco sauce, barbecue sauce, tartar sauce, mayonnaise, jams, jellies, spices, and the like. In some embodiments, the term "condiment" can include any and all additives that a user can choose to add to any food item for any purpose, e.g. for organoleptic, processing, or preservative purposes.

As used herein, the term "exterior" refers to the outside portion of a container, body, or other article.

As used herein, the term "film" can be used in a generic sense to include plastic web, regardless of whether it is film or sheet.

The term "filled" as used herein refers to an item (such as a pouch) that has been occupied with a product in a manner consistent with a commercial filling operation. Thus, a pouch may or may not be 100% filled.

The term "flexible" is used herein to refer to materials that are pliable and easily deform in the presence of external forces. In some embodiments, suitable flexible materials can be characterized by a modulus of less than about 50,000 PSI and in some embodiments less than 40,000 PSI (ASTM D-872-81).

The term "frangible seal" as used herein refers to a seal that is sufficiently durable to allow normal handling and storage, but ruptures or substantially ruptures under applied pressure. In some embodiments, suitable frangible seals can have a peel strength of from about 0.5 to less than about 5 pounds/inch, as measured by ASTM F88 (incorporated by reference in its entirety herein).

The term "interior" as used herein refers to the inside portion of an article, such as a pouch or a container or body.

The term "polymeric film" as used herein refers to a thermoplastic material, generally in sheet or web form, having one or more layers formed from polymeric or other materials that are bonded together by any conventional or suitable method, including one or more of the following: coextrusion, extrusion coating, lamination, vapor deposition coating, and the like.

As used herein, the term "pouch" refers to any of the wide variety of containers known in the art, including (but not limited to) bags, packets, packages, and the like.

As used herein, the term "seal" refers to any seal of a first region of an outer film surface to a second region of an outer film surface, including heat or any type of adhesive material, thermal or otherwise. In some embodiments, the seal can be formed by heating the regions to at least their respective seal initiation temperatures. The sealing can be performed by any one or more of a wide variety of methods, including (but not limited to) using a heat seal technique (e.g., melt-bead sealing, thermal sealing, impulse sealing, dielectric sealing, radio frequency sealing, ultrasonic sealing, hot air, hot wire, infrared radiation).

The term “valve” as used herein refers to any device by which the flow of material can be started, stopped, rerouted or regulated by a movable part that opens, closes, or partially obstructs a passageway through which the material flows. In some embodiments, a suitable valve can comprise (but is not limited to) an umbrella valve, duckbill valve, reed valve, ball valve, flapper valve, poppet valve, Gott valve, check valve, or any suitable combination thereof.

Any direction referred to herein, such as “top,” “bottom,” “left,” “right,” “upper,” “lower,” and other directions and orientations are described for clarity in reference to the figures and are not to be limiting. It is to be understood that the films or systems described herein can be used in a wide variety of directions and orientations.

All compositional percentages used herein are presented on a “by weight” basis, unless designated otherwise.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

III. The Disclosed Dispensing System

Figure 1B:
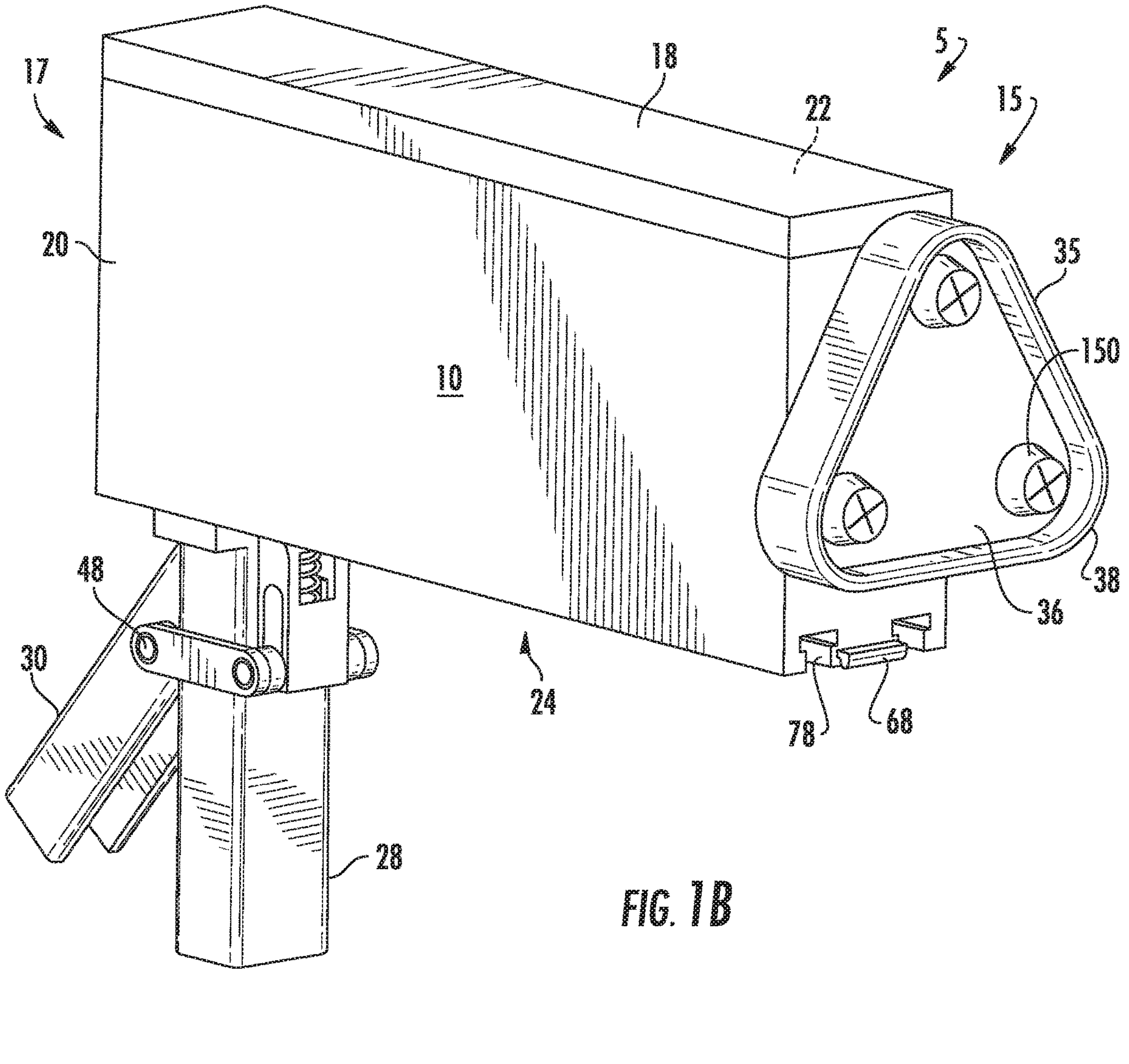
FIG. 1B is an isometric view of a dispenser with an optional discharge unit in accordance with some embodiments of the presently disclosed subject matter.

As illustrated in FIGS. 1A and 1B, one embodiment of the disclosed dispenser 5 comprises a body 10 with an aperture 12 through which a spout 178 of pouch 175 may protrude (see e.g., FIGS. 2 & 6) to dispense a product 180. Product 180 dispensed from dispenser 5 exits aperture 12 and spreads to fill a diffuser 14 that is adapted to receive a discharge unit 35 as shown in FIG. 1B. In the illustrated embodiment, the diffuser 14 is formed as an extension of end plate 16 located at a dispensing end 15 of the body 10 and that may be molded as part of the body 10. Alternatively, the end plate 16 may be a separate component that is attached to body 10. In the illustrated embodiment, the body 10 includes a rectilinear cross section and includes a top 18, opposed sides 20, 22, bottom 24, and a proximal end 17 opposite the dispensing end 15. The interior 26 of body 10 is sized to accommodate a pouch 175 containing product 180. As described below, pouch 175 has a generally flat shape defined by panels 174, 176. Consequently, the interior 26 of body 10 may have an elongated shape roughly corresponding to the shape of the pouch 175. In one embodiment, the rectangular shape of body 10 permits a pouch 175 to be inserted vertically into the interior 26 of body 10. That is, the distance between sides 20, 22 is smaller than a distance between top 18 and bottom 24 of body.

As set forth herein above, pouch 175 comprising product 180 is housed within the interior 26 of dispenser 5. In some embodiments, pouch 175 is constructed from any of the wide variety of polymeric materials known and used in the art. In some embodiments, pouch 175 comprises at least one frangible seal to enable product 180 to exit the pouch in response to increased pressure. However, pouch 175 is not limited and can be any pouch known and used in the art. In one or more embodiments, the pouch may be as described in co-pending, commonly assigned patent application PCT/US2015/041539, filed on Jul. 22, 2015 and published as WO/2016/018694, the contents of which are hereby incorporated by reference herein.

Figure 6:
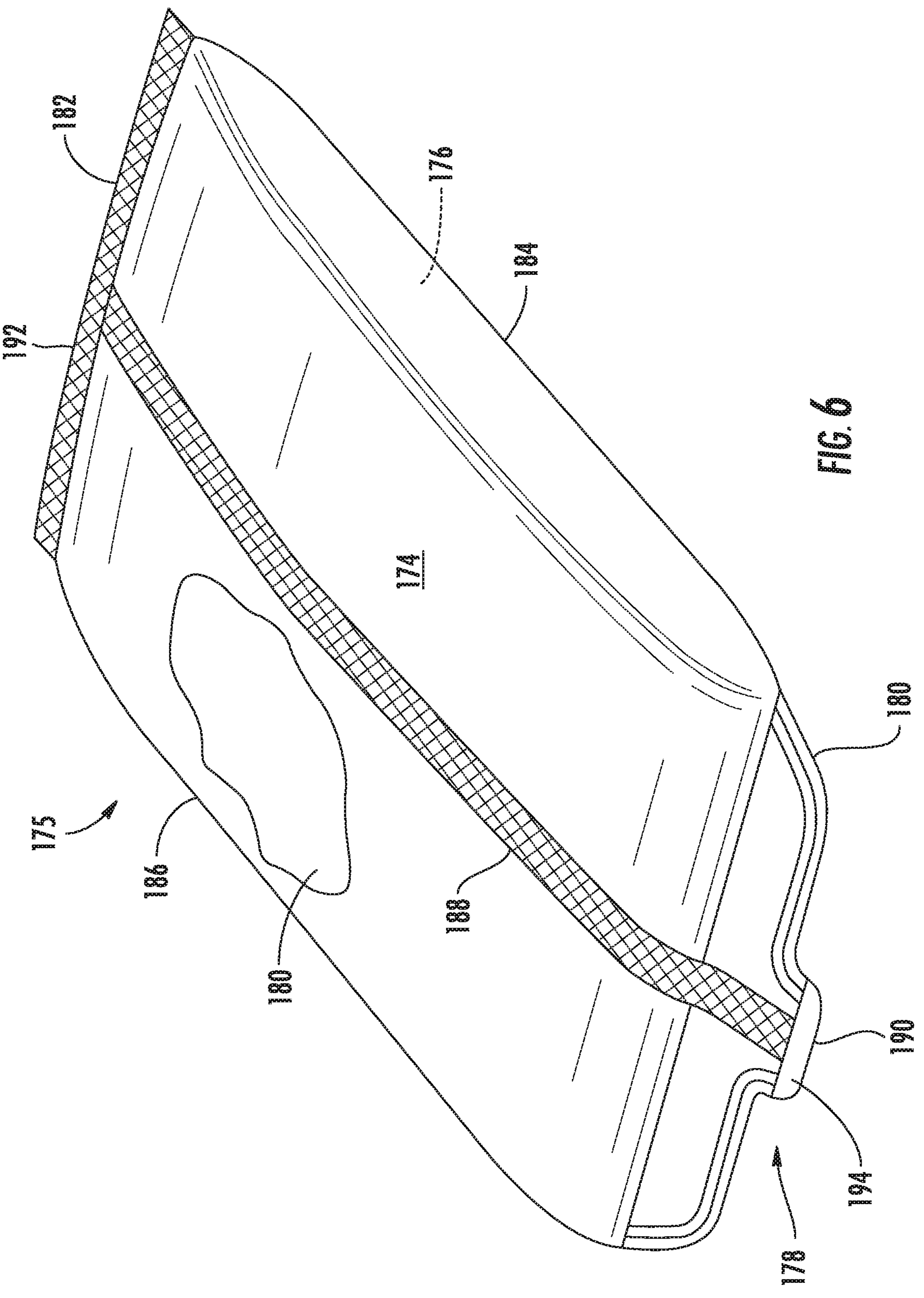
FIG. 6 is an isometric view of a product pouch for use with a dispensing system in accordance with some embodiments of the presently disclosed subject matter.

In the embodiment illustrated in FIG. 6, pouch 175 comprises first and second panels 174, 176 that are sealed together at a first transverse seal 180, a second transverse seal 182, a first side fold 184, a second side fold 186, a longitudinal seal 188, a first pouch end 190, and a second pouch end 192. Seals 180, 182, 188 can be formed using any suitable method, known and used in the art, including e.g. the use of heat, pressure, adhesive, and/or mechanical closure. As shown, first transverse seal 180 does not span first pouch end 190 and pouch spout 178. Rather, in some embodiments, pouch spout 178 includes frangible seal 194 positioned between the first and second panels 174, 176 using a heat seal, ultrasonic seal, static seal, RF seal, adhesive, or a combination thereof. Frangible seals are known to those of ordinary skill in the packaging art. See, for example, U.S. Pat. No. 6,983,839 and U.S. Patent Application Publication No. 2006/0093765, the entire disclosures of which are hereby incorporated by reference.

In some embodiments, frangible seal 194 may include a peelable sealant comprising any suitable sealant known in the art, e.g. DuPont APPEEL® resins such as those based on EVA, modified EVA, ethylene/acrylate copolymer, or modified ethylene/acrylate copolymer blends of immiscible polymers, such as polyethylene and polybutylene; polyethylene, such as low density polyethylene and/or EVA copolymers blended with polypropylene, polyethylene blended with polybutene-1, random propylene/ethylene copolymer blended with polybutene-1, EVA or LDPE blended with polypropylene, LDPE blended with EVA and polypropylene, to introduce a molecular incompatibility into the sealant layer. It is believed that the molecular incompatibility creates discontinuities that reduce the force necessary to rupture the seal. Alternatively or in addition, the sealant can be printed in a pattern on a surface of the film. Alternatively or in addition, the peelable sealant can implemented as a separate label that is disposed between panels 174, 176. Typical seal strengths of peelable sealant can in some embodiments be less than about 5 pounds/inch in accordance with ASTM F88-05. A peelable sealant will typically allow the user to open the seal with relatively little effort (e.g. by advancing a squeeze roller 32 within the body interior). In some cases, peelable sealant can peel away from the surface to which it is adhered. Alternatively, a rupture of the sealant (cohesive failure) or breakage of the sealant and delamination along an adjacent layer interface can occur. See, for example, U.S. Pat. Nos. 4,875,587; 5,023,121; 5,024,044; 6,395,321; 6,476,137; 7,055,683; and 2003/0152669, the entire disclosures of which are hereby incorporated by reference herein.

In one or more embodiments, dispenser 5 comprises discharge unit 35 connected to diffuser 14 through which packaged product is dispensed. As shown in FIG. 1B, discharge unit 35 comprises at least one valve 150 though which packaged product 180 can be dispensed. The illustrated discharge unit 35 is sized and shaped to mate to diffuser 14. FIG. 1B illustrates bottom face 36 of discharge unit 35 into which the valves 150 are inserted. In some embodiments, the bottom face 36 of the discharge unit comprises lip 38 to facilitate flow of the packaged product out of the dispenser 5 and to minimize messes. In addition, in some embodiments, lip 38 can function to support the package in an upright position.

In the illustrated embodiment, the discharge unit 35 and the diffuser 14 are triangular in shape to accommodate three valves 150. Other shapes are permissible. For instance, where five valves 150 are used, the diffuser 14 and discharge unit 135 may have a pentagonal shape. Other shapes, such as circular, elliptical, rectilinear, star shaped, and the like accommodating one or more valves 150 are contemplated. In some embodiments, the discharge unit 135 may be secured to the diffuser 14 with a coupling mechanism that includes, for example, screw threads, snap fit, bayonet mount or any connection mechanism known and used in the art. It should be appreciated that in some embodiments discharge unit 35 and diffuser 14 can be combined into a single component. Such a combination may be desirable for reducing part count and material costs. However, separating the diffuser 14 and discharge unit 35 into separate parts may offer advantages such as adaptability for different dispensed products and ease of cleaning. In one embodiment, flow-through aperture 12 in end plate 16 includes a valve 150 and may or may not include diffuser 14.

Valve 150 can be of any suitable variety known in the art, and can have at least one passageway to allow packaged product 180 to exit the pouch 175. Valve 150 can be constructed in any suitable shape, e.g. circular, square, oval, and the like. Valve 150 can be of any suitable type, such as an umbrella valve, gate valve, duckbill valve, reed valve, ball valve, flapper valve, poppet valve, Gott valve, check valve, or any suitable combination thereof. In some embodiments, valve 150 can be optional when dispensing high viscosity, thixotropic, or non-Newtonian fluids, but are generally required for lower viscosity, Newtonian fluids. In addition, discharge unit 35 can comprise three valves as shown in the Figures or any number of valves, depending on the product to be dispensed, i.e., one, two, four or more. Valves 150 may be formed integrally into the end plate 16 and/or discharge unit 35, through techniques such as co-molding or adhesives, for example. Alternatively, the valves 150 may be removable and replaceable to facilitate cleaning or use with different types of products 180.

A grip 28 and actuator 30 descend from the bottom 24 of the body 10. In the illustrated embodiment, the grip 28 does not pivot or change orientation with respect to the body 10. However, in the course of dispensing product 180 from pouch 175, the grip 28 will generally move from the proximal end 17 of body 10 to dispensing end 15. The grip 28 is coupled to a squeeze pusher or roller 32 via a connecting rod 34 or other suitable coupling mechanism. The actuator 30 is pivotably attached to the grip 28 at pivot point 48 and is squeezed by an operator to dispense product 180 using the dispenser 5. With each actuation of the actuator 30, the grip 28 and squeeze roller 32 are displaced towards the dispensing end 15. A retainer such as cover 40 or other mechanism (e.g., clips, springs, or clamps, etc. . . . ) at a proximal end 17 of the body 10 secures the second pouch end 192 in place. As the squeeze roller 32 is moved along within the interior 26 of the body 10, the squeeze roller 32 will slide along the exterior of the pouch panel 174 or 176, applying pressure to the pouch 175 and cause the product to exit the spout 178 at the dispensing end 15 of the dispenser 5. The illustrated squeeze roller 32 is cylindrical in shape with a round cross section. However, other shapes are permissible, including for example, square, oval, or elliptical solid bodies or planar curved plate bodies such as a plate or disc. Generally, the squeeze roller 32 may have curved surfaces or edges to apply pressure to the pouch while reducing a risk of puncturing the pouch 175. As used herein, the terms “squeeze roller” and “squeeze pusher” are intended to be synonymous and refer to a pusher or any structure or body having a rigid or semi-rigid construction that is urged in a direction from a proximal end 17 of the dispenser 5 towards a dispensing end 15 of the dispenser 5 while pushing against, sliding along, or otherwise compressing the contents of the pouch 175 for the purpose of increasing pressure of the product 180 in the pouch 175 thereby causing the product 180 to dispense from a dispensing end 15 of the dispenser 5.

Figure 2:
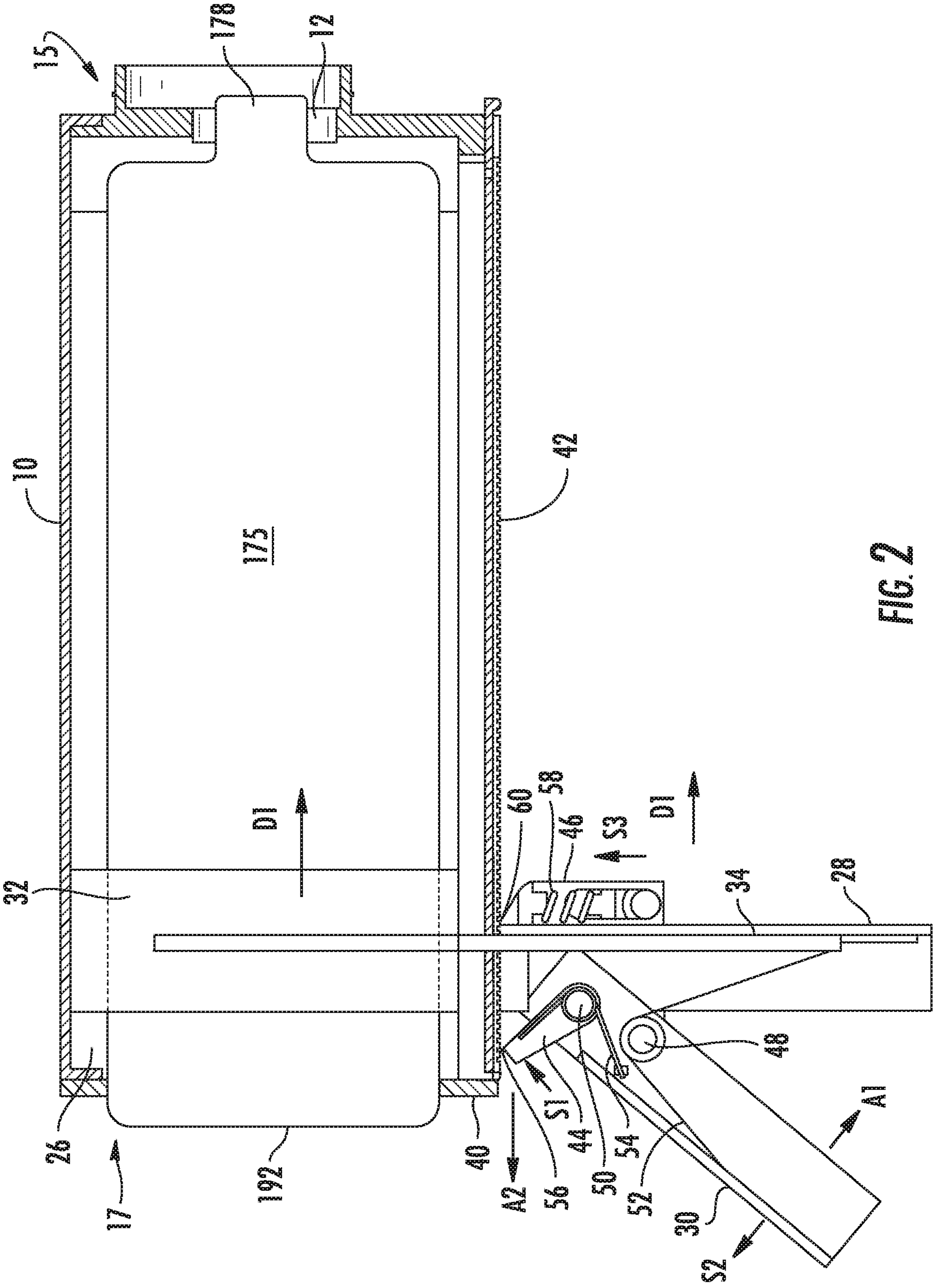
FIG. 2 is side section view of a dispenser system including a product pouch in accordance with some embodiments of the presently disclosed subject matter.
Figure 3:
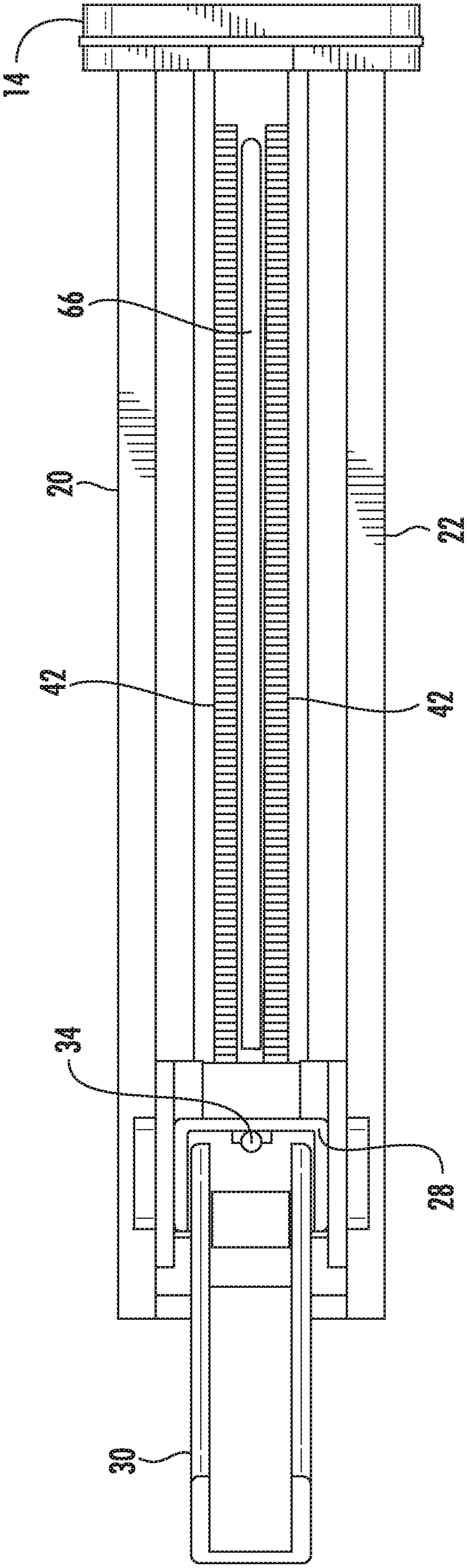
FIG. 3 is bottom view of a dispenser in accordance with some embodiments of the presently disclosed subject matter.

FIGS. 2 and 3 most clearly show a set of teeth 42 that are engaged by a driver pawl 44. The driver pawl 44 is pivotably coupled to actuator 30 at pivot point 50. A biasing element 54 urges the driver pawl 44 towards and into engagement with the teeth 42, as indicated by arrow S1. A separate biasing element 52 is coupled to actuator 30 and urges the actuator 30 away from grip 28, as indicated by arrow S2 to the home position shown in the Figures. To dispense the product 180, an operator may squeeze the actuator 30, such as with the palm of their hand, towards the grip 28 in the direction of arrow A1. This squeezing action causes the actuator 30 and the driver pawl 44 to rotate about pivot point 48. In pivoting about point 48, the driver pawl 44, which is engaged with teeth 42 at engagement point 56 will apply a pushing force in the direction of arrow A2. This pushing force will cause the body 10 to move in the same direction A2. The net effect is that grip 28 and squeeze roller 32 move with respect to the body 10 in an opposite direction indicated by arrows D1. This motion of the squeeze roller 32 will apply pressure to the pouch 175 and cause the product to exit the spout 178 at the dispensing end 15.

As the grip 28 and squeeze roller 32 move to a new position in direction D1, a separate retainer pawl 46 coupled to the grip 28 holds this new position by engaging the teeth 42 at a retention point 60. A biasing element 58 urges the retainer pawl 46 towards and into engagement with the teeth 42, as indicated by arrow S3. The retainer pawl 46 includes retainer teeth 64 (FIG. 4) that are sloped towards the proximal end 17. As the grip 28 and retainer pawl 46 move in the direction D1, the retainer teeth 64 are able to disengage and slide over teeth 42 until the actuator movement is complete. At which point, the retainer teeth 64 engage the teeth 42 to prevent the grip 28 and squeeze roller 32 from moving backwards in a direction opposite to arrow D1. In some instances, the pressure applied to the pouch 175 that causes the product 180 to exit the spout 178 may remain and cause excess product 180 to emerge or continue emerging from the spout 178. Therefore, in one or more embodiments, the pitch on teeth 42 and the location of retention point 60 may be designed to allow the grip 28 and squeeze roller 32 to move slightly backwards in a direction opposite to arrow D1, thus alleviating some of the built up pressure.

After squeezing the actuator 30 to dispense product, biasing member 52 causes the actuator 30 to return to a home position where it is displaced from grip 28. In returning to this home position, the actuator 28 and driver pawl 44 rotate again about pivot point 48. The driver pawl 44 and drive pawl teeth 62 (FIG. 4), which are also sloped towards the proximal end 17, disengage from teeth 42 and slide along teeth 42 to a new engagement point 56 upstream of its previous location. Once the driver pawl 44 reengages with the teeth 42, the dispenser 5 is reset for further dispensing.

FIG. 3 shows a bottom view of dispenser 5 and shows that teeth 42, in the illustrated embodiment, actually consist of two rows of teeth that are on opposite ends of a longitudinal slot 66. The slot 66 is sized to accommodate the connecting rod 34 and permits joint movement of the grip 28 and squeeze roller 32 in the dispensing direction D1. The pitch of teeth 42 may be adjusted to alter the metered volume of product 180 that is dispensed with each actuation. In one embodiment, the teeth 42 are formed as a part of body 10 so that different bodies might be used to dispense different volumes for different products 180. In another embodiment illustrated in FIG. 4, the teeth 42 are formed as part of a removable and replaceable toothed insert 68. Different toothed inserts 68 may be color coded or otherwise labeled for use with particular products 180. In other embodiments, a single row or more than two rows of teeth 42 may be used. In other embodiments, the longitudinal slot 66 may be offset towards one side 20 or the other 22 of body 10. In other embodiments, a row of teeth 42 may be centrally located, approximately equidistant between sides 20, 22. The individual protrusions of the teeth 42 may have a variety of shapes, including protruding triangles, protruding squares, involute tooth profiles or other gear tooth profiles. Similar functionality may be provided where teeth 42 consist of periodic recesses that are engaged by the actuator drive mechanism as described herein.

Figure 4:
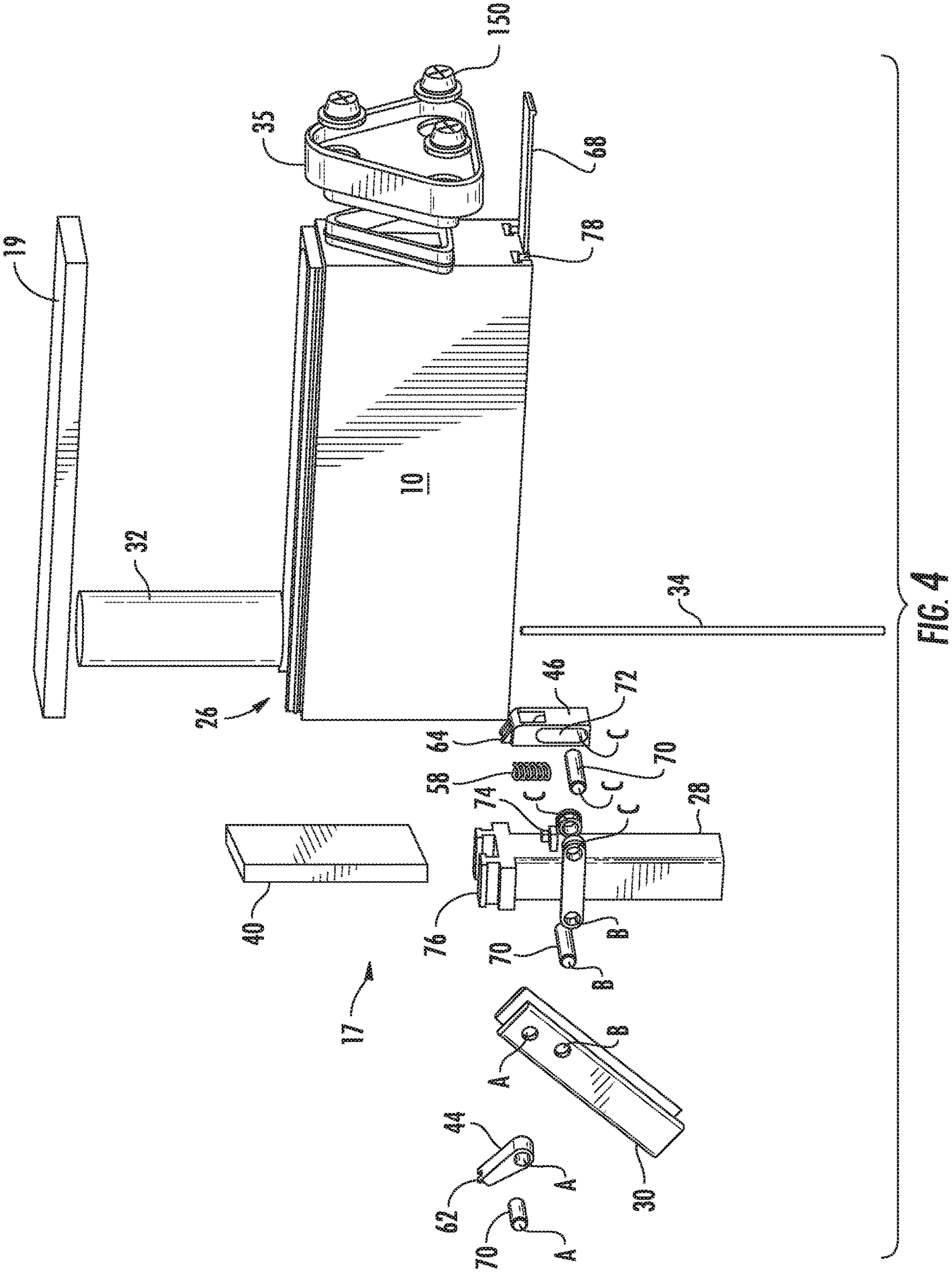
FIG. 4 is an isometric exploded assembly view of a dispenser in accordance with some embodiments of the presently disclosed subject matter.

FIG. 4 shows an exploded assembly view showing in greater detail how some of the actuator components are assembled. In FIG. 4, features that are assembled together at a common location are labeled with letters A, B, or C. For instance, driver pawl 44 is coupled to actuator 30 with a retainer 70 at features labeled A. Retainer 70 may be a pin or other component that permits pivotable rotation between driver pawl 44 and actuator 30. Similarly, retainer pawl 46 is coupled to grip 28 with retainer 70 at features labeled C. Notably, retainer pawl 46 includes a slot 72 that allows the retainer pawl 46 to move up and down while biasing member 58 urges the retainer pawl 46 towards teeth 42. Biasing member 58 is coupled to grip 28 at a perch 74. FIG. 4 also shows that actuator 30 is coupled to grip 28 with a retainer 70 at features labeled B.

In the illustrated embodiment, the grip 28 includes a pair of ribs 76 that slidingly engage channels 78 formed into the bottom 24 of body 10. The ribs 76 and channels 78 are shaped to allow constrained forward and backwards movement of the grip 28 within the body 10 along and opposite to direction D1. At the same time, the ribs 76 and channels 78 constrain motion along and about other degrees of translation or rotation to provide stable support for the pressure applied by squeeze roller 32 and resisted by a pouch 175 containing product 180.

FIG. 4 illustrates that covers 19, 40 of body 10 may be formed as separate, removable components that provide access to the interior 26 of body 10, allowing a used pouch to be removed and a new pouch 175 to be inserted. In one embodiment, the body 10 is a tubular structure with an attachable cover 40 at a proximal end 17 and an end plate 16 at a dispensing end 15. In embodiments where removable covers 40, 16 are attached at the proximal 17 and dispensing 15 ends, the grip 28 and squeeze roller 32 can be removed from the body at the dispensing end 16 and reinserted at the proximal end 17, such as when refilling a dispenser 10 with a new pouch 175 containing product 180. Actuator 5 and components therein can be constructed from any suitable rigid or semi-rigid material known in the art, such as metal, wood, rubber, plastic, and the like. Some examples may include aluminum, steel, brass, bronze, tin, polyethylene terephthalate, high density polyethylene, low density polyethylene, polyvinyl chloride, polypropylene, polystyrene, acrylonitrile butadiene styrene, polyamide, polycarbonates, or combinations thereof. Components of actuator 5 can be constructed using any conventional process known in the art, such as rotational molding, blow molding, reheat stretch blow molding, injection molding, casting, roll forming, stamping, and the like. A tubular body 10 may be manufactured by an extrusion process.

Figure 7A:
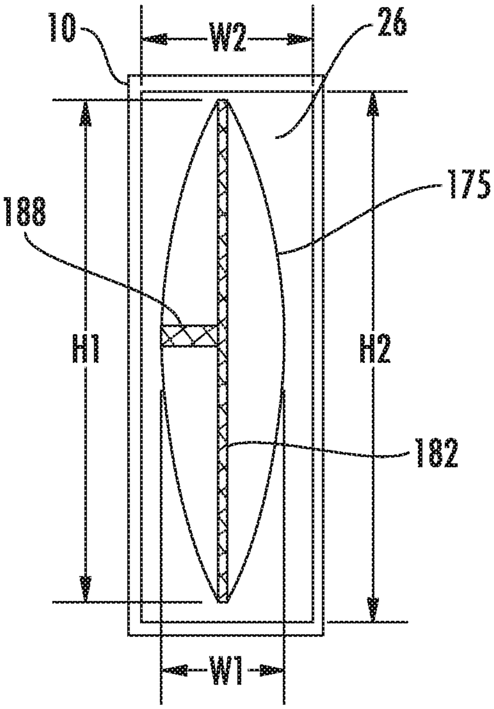
FIGS. 7A and 7B are end views of a product pouch disposed within an actuator body in accordance with some embodiments of the presently disclosed subject matter.
Figure 7B:
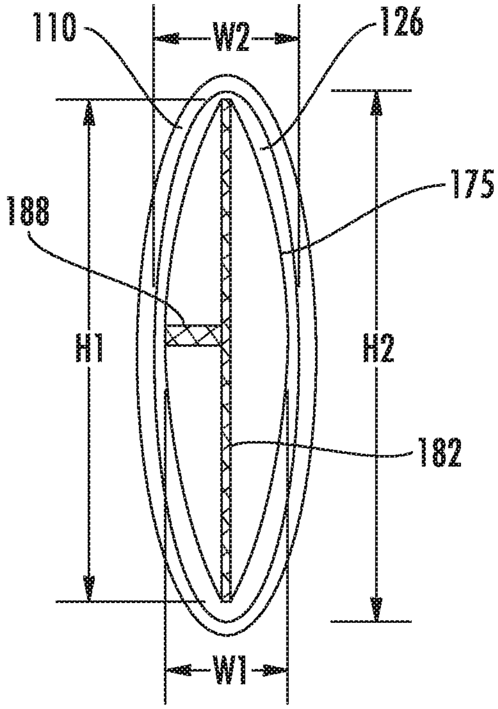
Figure 8:
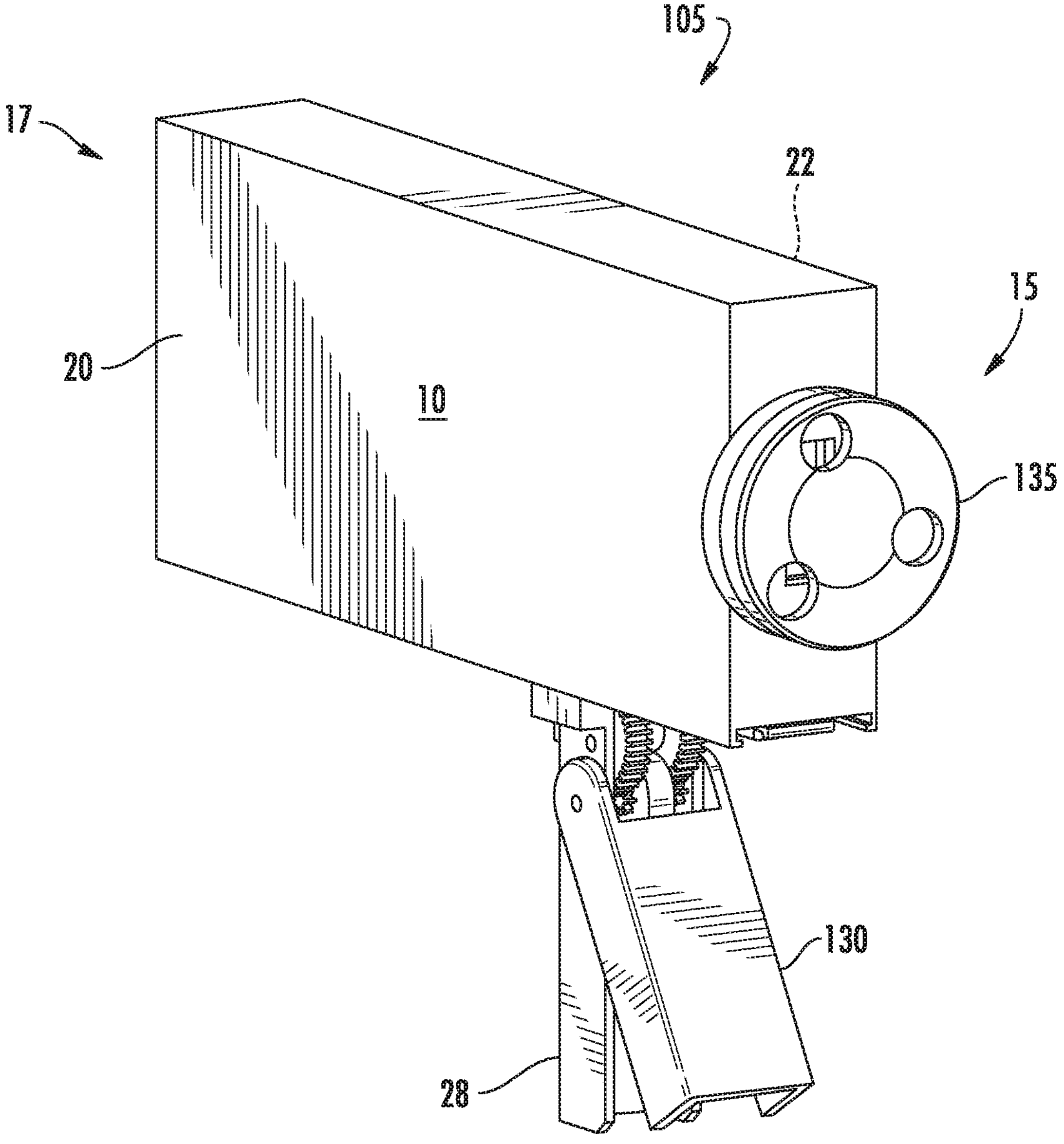
FIG. 8 is an isometric view of a dispenser with an optional discharge unit in accordance with some embodiments of the presently disclosed subject matter.

In some embodiments, the body 10 may have a cross sectional shape that is not strictly rectilinear. For instance, the body 10 may have a an oval or elliptical shape with a distance between the sides being smaller than a distance between the top and bottom of the body. More particularly, the shape of the body 10 should define an interior volume 26 that has a height between the top and bottom of the volume that is larger than a width between the sides of the volume. For example, FIGS. 7A & 7B show two illustrative examples of a body 10, 110 characterized by an elongated cross section shape roughly corresponding to the shape of the pouch 175. In each Figure, a pouch 175 is disposed with the interior 26, 126 of the body 10, 110. Seals 182 and 188 on the pouch 175 are visible in each Figure. In both FIGS. 7A & 7B, the height H1 and width W1 dimensions of the product-filled pouch 175 are illustrated. Similarly, the height H2 and width W2 dimensions of the interior 26, 126 are also illustrated. In one or more embodiments, the aspect ratio of the body, i.e. the H2:W2 ratio, is similar to the aspect ratio H1:W1 of a product-filled pouch 175. In a natural resting state, a product-filled pouch 175 may have an aspect ratio in the range between about 2:1 to 7:1. In one representative example, a pouch 175 containing about 475 ml of product 180 may have a height H1 of about 95 mm and a width W1 of about 25 mm, which yields an aspect ratio H1:W1 of about 3.8:1. Larger aspect ratios may become impractical for handheld product dispensing. Smaller aspect ratios are achievable by increasing the volume of product disposed within the pouch 175. However, overfilling the pouch 175 with excess product 180 may increase the likelihood of undesirable bursting or puncturing of the pouches 175 during handling and in transit. Nevertheless, embodiments of dispensers 5 described herein may still be designed, modified, and used with product-filled pouches 175 having an aspect ratio H1:W1 smaller than 2:1 (where the pouches 175 are not overly handled or transported) or larger than 7:1 (for dispensers that are not handheld).

Naturally, the interior volume 26, 126 of body 10 should be large enough to accommodate a product-filled pouch 175. However, it may be desirable to limit the size or at least the width W2 of the interior volume 26, 126 so that as the squeeze roller 32 moves to compress the pouch 175, that compressive force is directed to dispense the product 180 instead of merely allowing the pouch 175 to expand laterally. Thus, the aspect ratio of a cross section of the interior 26, 126 may be similar to that of the pouch 175. In one embodiment, a cross section of the interior 26, 126 may have an aspect ratio H2:W2 that is also in the range between about 2:1 to about 7:1. In some embodiments, the width W2 of the interior 26, 126 may be similar to the width of pouch W1 while the height H2 is increased to accommodate pouches 175 having different volumes of product 180. Thus, the H2:W2 aspect ratio of a cross section of the interior 26, 126 may be at the high end or slightly larger than the representative range 2:1 to 7:1. In other embodiments, the height H2 and width W2 of the interior 26, 126 may be increased by similar amounts over height H1 and width W1 of the pouch. For instance, a dispenser body 10 may include an interior height H2 and width W2 that are each 20 mm larger than the exemplary pouch dimensions given above (95 mm, 25 mm). Thus, the aspect ratio of a cross section of this exemplary interior 26, 126 may be 115 mm:45 mm or about 2.6:1. Accordingly, in some embodiments, the H2:W2 aspect ratio of a cross section of the interior 26, 126 may be at the low end or slightly smaller than the representative range 2:1 to 7:1.

FIGS. 8-11 show an alternative embodiment of a dispenser 105 characterized by alternative embodiments of squeeze pusher 132, actuator 130, and discharge unit 135. In this embodiment, the grip 28 is similar to embodiments described above. That is, the grip 28 is slidable with respect to the body 10 and is coupled to the squeeze pusher 132. In this embodiment, the actuator 130 is disposed on the dispensing side of the grip 28 in contrast to actuator 30 described above, which is disposed on the proximal side of the grip 28. In embodiments described above, the actuator 30 may be displaced towards the grip 28 by squeezing the actuator 30 with the palm of an operator's hand. In the embodiment shown in FIGS. 8-11, the actuator 130 may be displaced towards the grip 28 by squeezing the actuator 130 with the fingers of an operator's hand.

Figure 10:
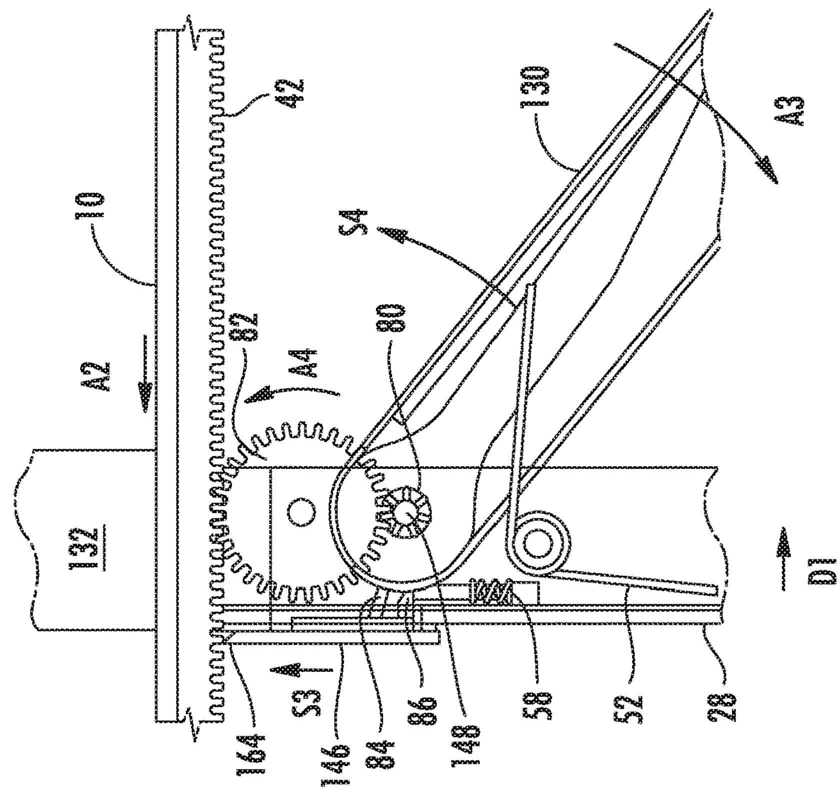
FIG. 10 is side section detail view of a dispenser system including a gear drive mechanism in accordance with some embodiments of the presently disclosed subject matter.
Figure 9:
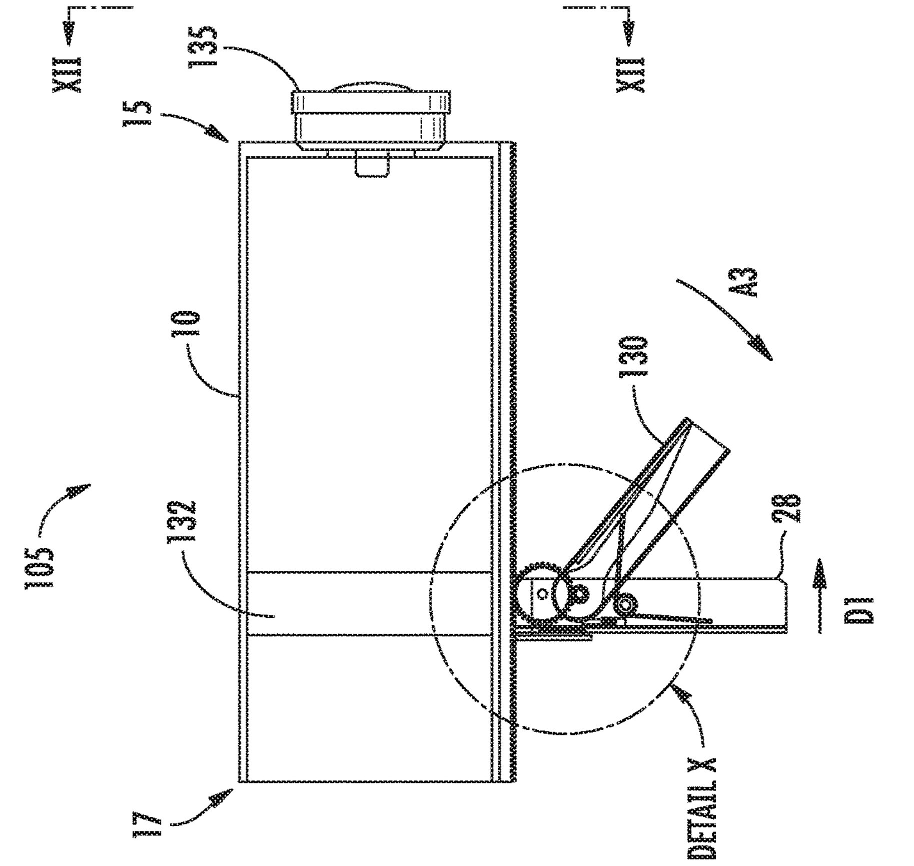
FIG. 9 is side view of a dispenser system in accordance with some embodiments of the presently disclosed subject matter.

A mechanism for implementing a finger-actuated actuator 130 is illustrated in greater detail in FIGS. 9 & 10, which show a set of gears 80, 82 that couple the actuator 130 to the teeth 42. In this embodiment, a first gear 80 is coupled to and rotates with the actuator 130 when the dispenser 105 is actuated by squeezing in the direction indicated by arrow A3 (clockwise in FIG. 10). A second gear 82 is coupled to the grip 28 and engaged by the first gear 80. Thus, when the dispenser 105 is actuated, the second gear 82 rotates opposite the first gear 80 in the direction indicated by arrow A4 (counter-clockwise in FIG. 10). A biasing element 52 is coupled to actuator 130 and urges the actuator 130 away from grip 28, as indicated by arrow S4 to the home position shown in the Figures. To dispense the product 180, an operator may squeeze the actuator 130, such as with their fingers, towards the grip 28 in the direction of arrow A3. This squeezing action causes the actuator 130 and the first gear 80 to rotate about pivot point 148. As a result, the second gear 82, which is engaged with teeth 42, will apply a pushing force in the direction of arrow A2. This pushing force A2 will cause the body 10 to move in the same direction A2. The net effect is that grip 28 and squeeze pusher 132 move with respect to the body 10 in an opposite direction indicated by arrows D1. This motion of the squeeze pusher 132 will apply pressure to the pouch 175 and cause the product to exit the spout 178 at the dispensing end 15.

Notably, the relative size of the gears 80, 82 establishes a gear ratio that can provide a mechanical advantage. For example, first gear 80 may be smaller and have fewer teeth than gear 82. Thus, the gear train amplifies the input torque provided by an operator squeezing the actuator 130. In addition, the first gear 80 may be coupled to actuator 130 with a one-way ratcheting mechanism as is known in the art. Consequently, the actuator 130 is able to turn first gear 80 in the direction indicated by arrow A3 to dispense the product. However, upon releasing the actuator 130 and allowing the biasing element 52 to urge the actuator 130 away from grip 28, the first gear 80 freewheels with respect to the actuator 130, allowing both gears 80, 82 to remain stationary. As the actuator 130 returns to its home position after being squeezed, the ratcheting interface between the actuator 130 and first gear 80 prevents the second gear 82 from pushing the grip 28 and squeeze pusher 132 back towards the proximal end 17.

As the grip 128 and squeeze pusher 132 move to a new position in direction D1, a separate retainer pawl 146 coupled to the grip 28 holds this new position by engaging the teeth 42 at an upstream retention point. A biasing element 58 urges the retainer pawl 146 towards and into engagement with the teeth 42, as indicated by arrow S3. The retainer pawl 46 includes retainer teeth 164 that are sloped towards the proximal end 17. As the grip 28 and retainer pawl 146 move in the direction D1, the retainer teeth 164 are able to disengage and slide over teeth 42 until the actuator movement is complete. At which point, the retainer teeth 164 engage the teeth 42 to prevent the grip 28 and squeeze pusher 132 from moving backwards in a direction opposite to arrow D1. In some instances, the pressure applied to the pouch 175 that causes the product 180 to exit the spout 178 may remain and cause excess product 180 to emerge or continue emerging from the spout 178. Therefore, in one or more embodiments, the pitch on teeth 42 or the design of the engagement between the teeth 42 and 164 and may be designed to allow the grip 28 and squeeze pusher 132 to move slightly backwards in a direction opposite to arrow D1, thus alleviating some of the built up pressure.

The illustrated embodiment of actuator 130 may include a quick retract mechanism that allows an operator to quickly and easily slide the grip 28 and squeeze pusher 132 from the dispensing end 15 to the proximal end 17 of the body 10 after a pouch 175 is emptied. FIG. 10 shows that actuator 130 includes a depressor 84 that is normally not engaged with retainer pawl 146 while product 180 is being dispensed. However, once a pouch 175 is empty or a user otherwise needs to retract the grip 28 and squeeze pusher 132 towards the proximal end 17, the operator can simply move the actuator towards the body 10 in a direction opposite to arrow A3. This movement causes the depressor 84 to contact a ledge 86 on the retainer pawl 146 and push the retainer pawl 146 against the biasing force provided by biasing element 58. This in turn causes the teeth 164 of the retainer pawl 146 to disengage from the teeth 42 on the body 10. Moreover, since the first gear 80 is coupled to actuator 130 with a one-way ratcheting mechanism, second gear 82 is able to rotate freely in a direction opposite to the direction indicated by arrow A4. Thus, an operator is able to quickly slide the grip 28 and squeeze pusher 132 from the dispensing end 15 to the proximal end 17 of the body 10 by merely lifting the actuator 130 and sliding the grip towards the proximal end 17.

Figure 11:
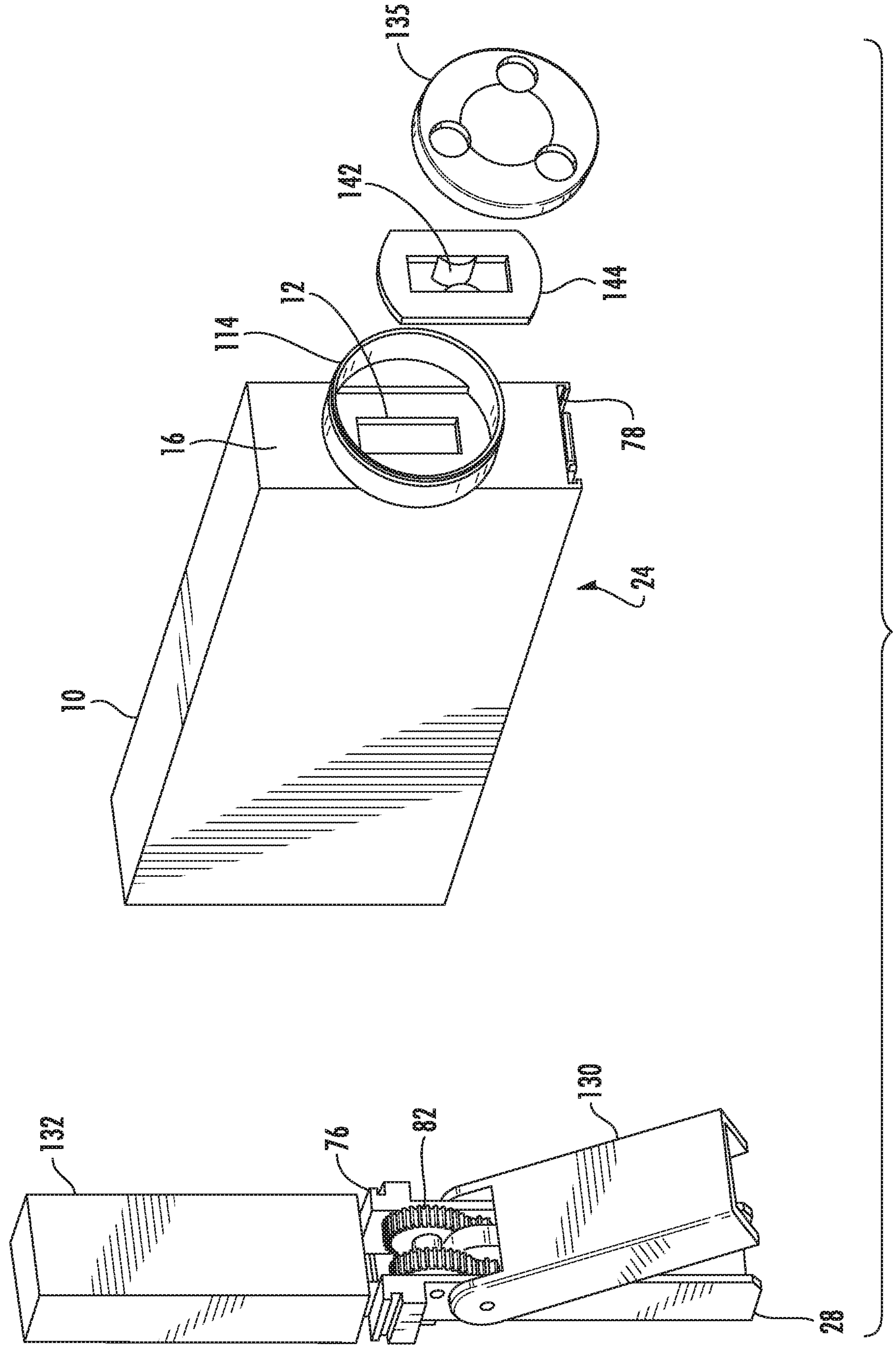
FIG. 11 is an isometric exploded assembly view of a dispenser in accordance with some embodiments of the presently disclosed subject matter.

FIG. 11 shows an exploded view of the dispenser 105 with the grip 28, actuator 130, and squeeze pusher 132 removed from the body 10. As with embodiments described above, the grip 28 includes a pair of ribs 76 that slidingly engage channels 78 formed into the bottom 24 of body 10. The ribs 76 and channels 78 are shaped to allow constrained forward and backwards movement of the grip 28 within the body 10 along and opposite to direction D1. At the same time, the ribs 76 and channels 78 constrain motion along and about other degrees of translation or rotation to provide stable support for the pressure applied by squeeze roller 32 and resisted by a pouch 175 containing product 180.

FIG. 11 also shows an alternative embodiment of a diffuser 114 and discharge unit 135 that are circular in shape and include three exit apertures to accommodate three valves 150 (not shown, but see e.g., FIGS. 1B and 4). In this embodiment, the discharge unit 135 includes a central convex protrusion 140 that may provide extra clearance for spout 178, which extends through aperture 12. The protrusion 140, which is concave on the inside of the discharge unit 135 (side facing the aperture 12), helps to deflect product 180 radially outward from the aperture 12 and towards the openings (e.g., valves) in the discharge unit 135.

Figure 12B:
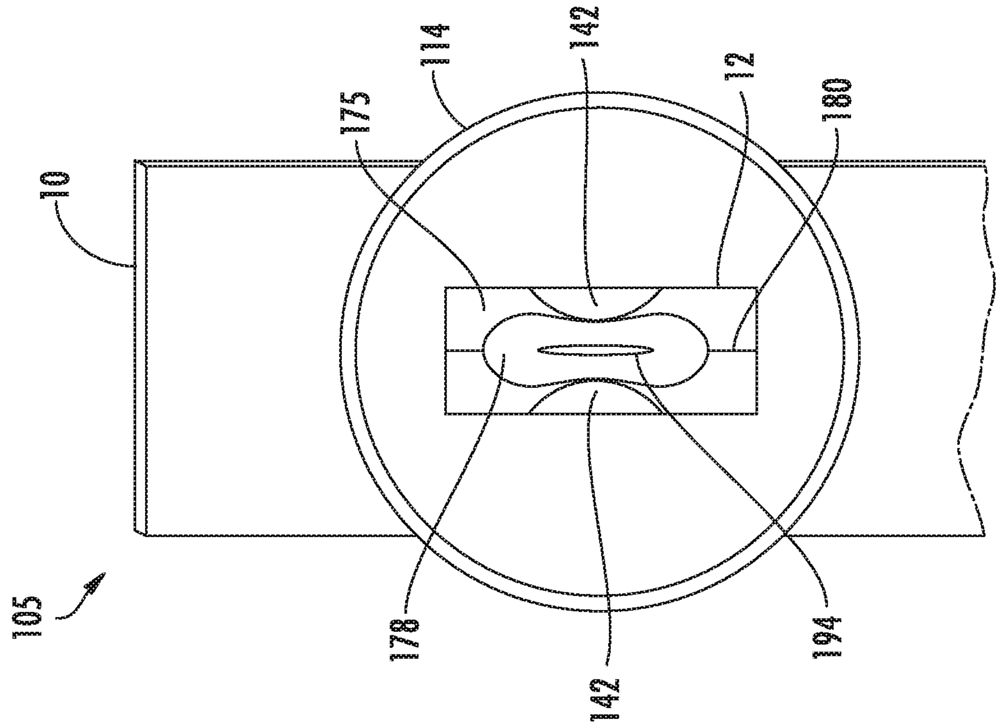
FIGS. 12A and 12B are end views of a product pouch spout extending through an exit aperture of an actuator body in accordance with some embodiments of the presently disclosed subject matter.
Figure 12A:
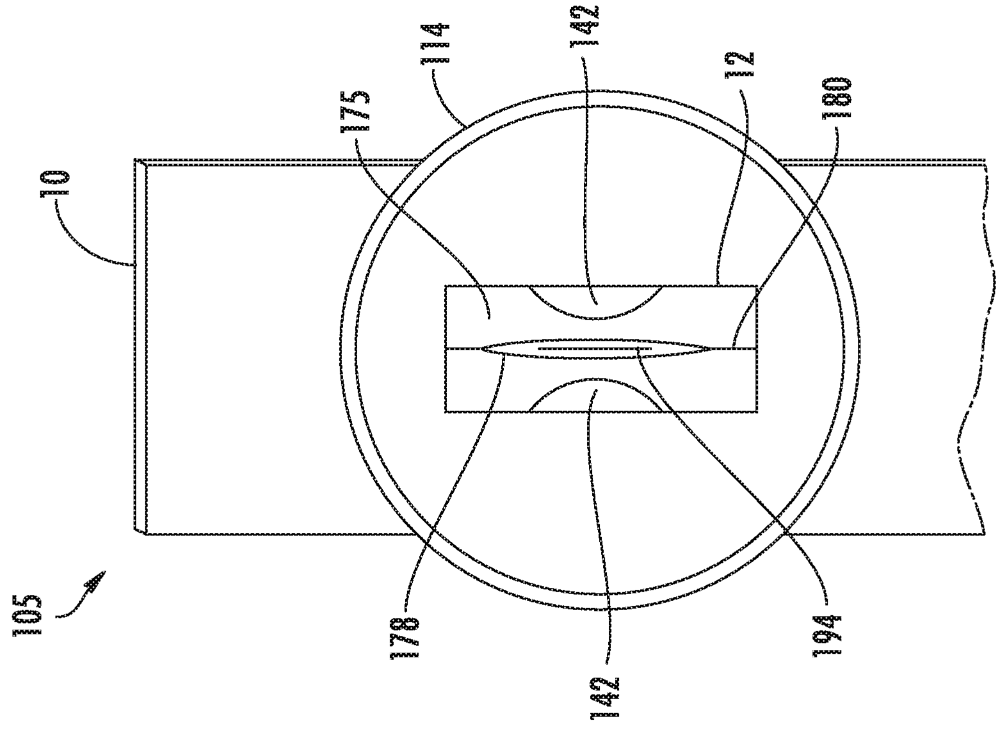

The illustrated embodiment also includes spout restrictor 142, which reduces the effective width of the aperture 12 through which the spout 178 extends. FIGS. 12A and 12B demonstrate a benefit of the spout restrictor 142. Both FIGS. 12A & 12B show a spout 178 of a pouch 175 protruding through the aperture 12 between the spout restrictor 142. In FIG. 12A, the pouch 175 is filled with product 180 and the frangible seal 194 is closed and intact. To begin dispensing product 180 from a new, sealed pouch 175, the frangible seal 194 can be burst open by actuating the dispenser 105 to build up enough internal pressure on the product 180 to open the frangible seal 194. For example, FIG. 12B shows a spout 178 where the frangible seal 194 has been opened.

A disadvantage of the flexible pouch 175 and spout 178 is that when the internal pressure on the product 180 begins to build, the pouch 175 and the spout 178 tend to deform or change shape. That is, the initial buildup of dispensing force generated by the squeeze pusher 132 is lost because it merely produces a change in shape of the pouch 175 instead of being applied to burst the frangible seal 194 and/or propel the product 180 out of the pouch 175. The asymmetric shape of the body helps to constrain this undesirable change in shape and ensure that compressive forces generated by the squeeze pusher 132 are applied to dispense the product 180 instead of merely allowing the pouch 175 to expand laterally. Similarly, the spout restrictor 142 helps to prevent unnecessary expansion or deflection of the spout 178.

During the initial buildup of the compressive forces applied by the squeeze pusher, the spout 178 tends to distort and change shape in a somewhat unpredictable manner as a result of variations in product densities, seal formation, or pouch construction, for example. Quite often, as pressure builds, the spout 178 will deflect to one side or another of a centerline of the pouch 175. In order to burst the frangible seal 194, additional force must be applied by the squeeze pusher 132 to straighten the flexible spout 178, and sufficiently fill the spout 178 so that pressure is applied directly to the frangible seal 194. As with the body of the pouch 175, the spout 178 itself may also be prone to expanding laterally. Allowing the spout 178 to expand results in further loss of the applied force because it merely produces a change in shape of the spout 178 instead of being applied to burst the frangible seal 194.

Thus, a benefit of the spout restrictor 142 can be seen in FIG. 12B. In the illustrated embodiment, the spout restrictor 142 is implemented as a pair of opposed, arched protrusions. Other shapes and configurations are certainly permissible. That is, the spout restrictor 142 may be formed as protrusions extending inward from the sidewalls of the aperture 12, or the sidewalls of the aperture 12 may have a contoured shape to restrict unwanted movement or expansion of the spout 178 or the aperture 12 may simply include a narrow aspect ratio. Moreover, the spout restrictor 142 may be formed onto a separate insert 144 as shown in FIG. 11 or alternatively be formed as part of discharge unit 135, or as part of diffuser 114, or as part of the end plate 16 of body 10.

The spout restrictor 142 may include a depth in a direction from the dispensing end 15 to the proximal end 17 that is similar to a length of the spout 178 so that all or a substantial portion of the spout 178 is constrained against unwanted deflection or expansion. For example, FIG. 11 shows the spout restrictor 142 with a depth that is thicker than the exemplary insert 144.

The spout restrictor 142 may be constructed as fixed features or movable features. Because the spout restrictor 142 narrows the aperture 12, it may be desirable to permit lateral movement to temporarily widen the aperture 12, making it easier to insert the spout 178. Similarly, because the spout restrictor 142 may have a depth that extends into the interior 26 of the body, the spout restrictor 142 may be moveable in an axial direction, for example to provide clearance for the pouch 175 and squeeze pusher 132 when the pouch 175 is nearly empty. Alternatively, relief or clearance features may be incorporated into the squeeze pusher 132 to accommodate

V. Methods of Using the Disclosed System

Dispenser 5 can dispense product 180 through valve 150 of discharge unit 35 onto a surface (such as a hamburger bun). Initially, a pouch 175 filled with product 180 is inserted into the interior 26 of the body through an opening formed by a removable cover 19, 40. A spout 178 of the pouch 175 can be guided through an aperture 12 in the end plate 16. Next, the grip 28 and squeeze roller 32 are inserted into the proximal end 17 of body 10 where the squeeze roller 32 initially contacts the second pouch end 192. A rear cover 40 or other suitable retainer secures the second pouch end 192 to the proximal end 17 of the dispenser body 10. To dispense product 180 disposed within pouch 175, an operator squeezes the actuator 30 as described above and causes the squeeze roller 32 to push against and increase pressure within the pouch 175 to dispense product 180 through valve 150. With each subsequent actuation, the grip 28 and squeeze roller 32 move from a proximal end 17 of the body 10 (such as that shown in FIG. 5A) towards a dispensing end 15 of the body 10 (such as that shown in FIG. 5B).

Figure 5A:
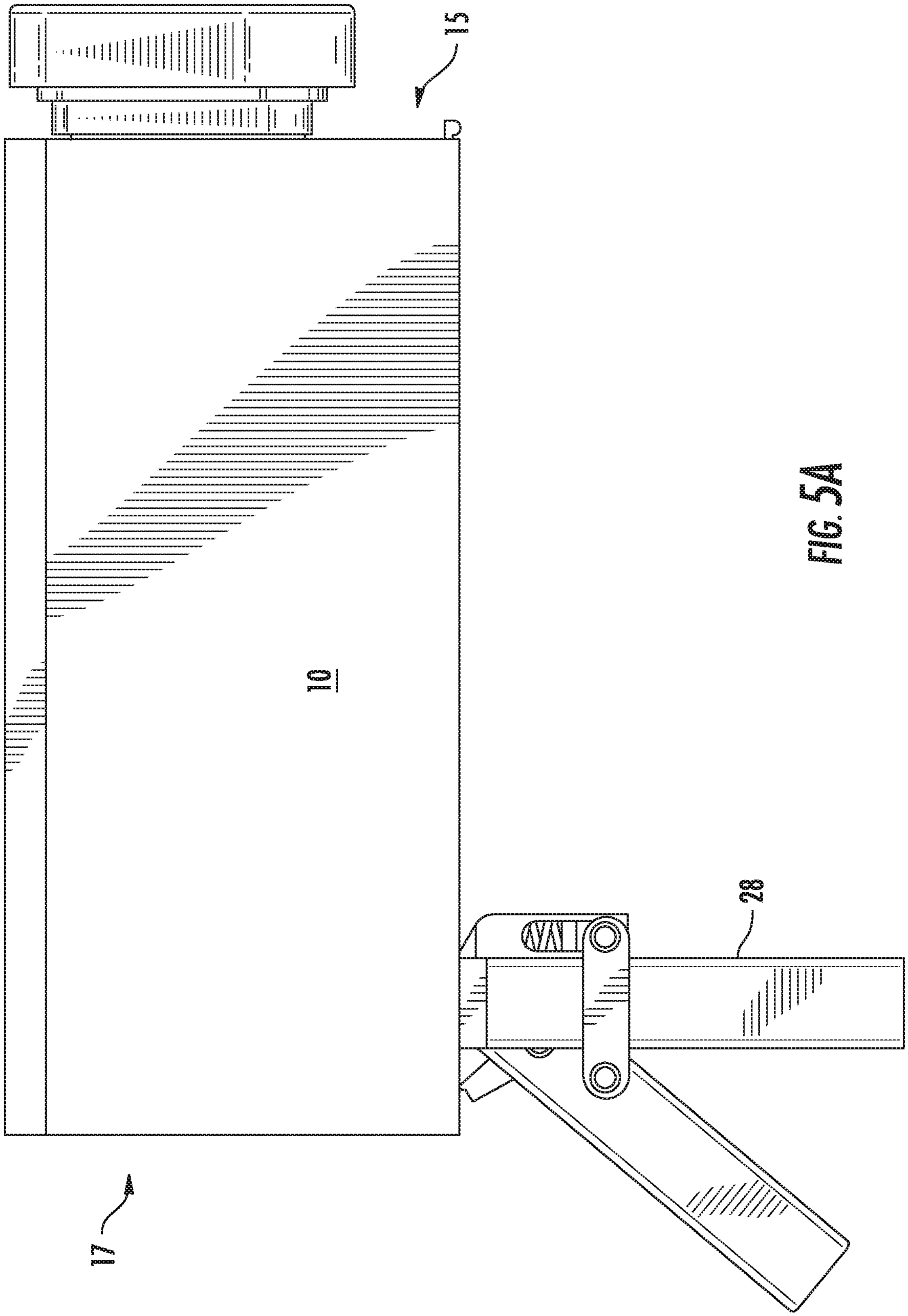
FIG. 5*a* is a side view of a dispenser with a grip and actuator disposed toward a proximal end of the actuator body in accordance with some embodiments of the presently disclosed subject matter.
Figure 5B:
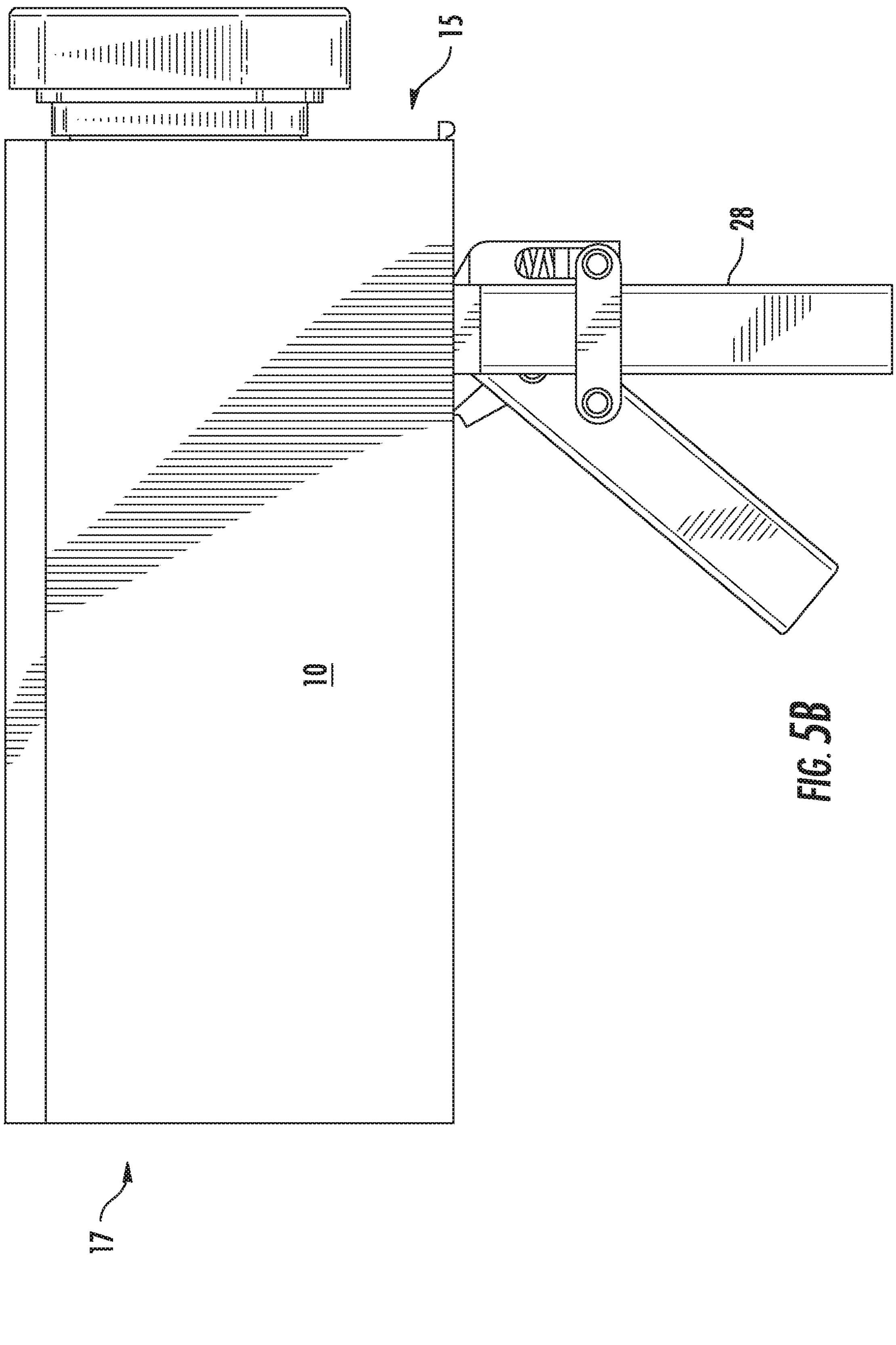
FIG. 5*b* is a side view of a dispenser with a grip and actuator disposed toward a dispensing end of the actuator body in accordance with some embodiments of the presently disclosed subject matter.

Once all or a desired amount of the product 180 is dispensed, the used pouch 175 may be removed in a number of different ways. In an embodiment where covers 40, 16 are attached at the proximal 17 and dispensing 15 ends of the body 10, the used pouch 175, the grip 28, and squeeze roller 32 may all be removed from the dispensing end 15 of the body. Alternatively, the grip 28 may be retracted by deflecting the driver pawl 44 and retainer pawl 46 against their respective biasing members 54, 58 to move the grip 28 and squeeze roller 32 from the dispensing end 15 (FIG. 5B) back to, and optionally out of, the proximal end 17 (FIG. 5A). Then, the used pouch 175 may be removed and the dispenser reloaded as discussed above.

VI. Advantages of the Presently Disclosed Subject Matter

In some embodiments, the presently disclosed subject matter lowers costs associated with materials and assembly with sufficient ruggedness to survive filling, closing, packing and shipping.

The dispenser further allows the dispensing of multiple doses of product in each dispensing application.

In addition, the disclosed system is easy to reload and requires no/minimal cleaning between reloads.

The disclosed dispenser has a reduce size that closely matches the size and shape of a product pouch.

The disclosed dispenser includes a rectilinear shaped body to permit stacking of the dispenser.

The disclosed dispenser includes features that reduce the force required to burst a frangible seal of a pouch containing product. The table below illustrates this benefit. In Table 1, the first column represents force quantities, including max/min, range, mean, and standard deviation. The numerical values in the other columns represent the corresponding forces required to burst a frangible seal for different body and/or spout configurations.

TABLE 1

| Force Required to Burst Frangible Seal | | | |
|---|---|---|---|
| Force | 1:1 Body | 2.3:1 Body | Spout restrictor |
| Min. | 166 | 104 | 38 |
| Max. | 229 | 167 | 98 |
| Range | 64 | 62 | 60 |
| Mean | 201 | 135 | 70 |
| Std. Dev. | 20 | 18 | 19 |

In the column labeled "1:1 Body," a conventional cylindrical body dispenser (1:1 height:width aspect ratio, e.g., as disclosed in patent application publication WO/2016/018694) was used and resulted in a mean force of 200 pounds required to burst a frangible seal 194 on a pouch 175 containing water. By comparison, the column labeled "2.3:1 Body" shows the test results where burst force was measured for identical pouches 175 filled with water, but where the pouches were constrained within a body 10 having a height:width aspect ratio of 2.3:1 as disclosed herein. One can see that the mean force required to burst the frangible seal 194 on these pouches 175 is reduced to 135 pounds, a reduction of about 33%. Finally, the column labeled "Spout restrictor" shows the test results where burst force was measured for identical pouches 175 filled with water, but where the pouches were constrained within a body 10 having a height:width aspect ratio of 2.3:1 and the spout 175 is also constrained with a spout restrictor 142 also as disclosed herein. One can see that the mean force required to burst the frangible seal 194 on these pouches 175 is reduced to 70 pounds, a further reduction of about 48% over the asymmetric body itself and a 65% reduction over the conventional cylindrical body with no spout restrictor 142.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A dispenser comprising:

a body comprising a proximal end and a dispensing end and opposed sides and an opposed top and bottom defining an interior space, the body including an asymmetric shape wherein a distance between the sides is smaller than a distance between the top and bottom of the body;

a row of teeth extending longitudinally along the bottom of the body from the proximal end to the dispensing end;

a grip slidingly engaged with the bottom of the body;

a squeeze pusher disposed within the interior space of the body, the squeeze pusher coupled to the grip and slidable within the interior space;

an actuator arm movably attached to the grip and biased to a home position away from the grip and movable from the home position towards the grip;

a driver pawl movably attached to the actuator and engageable with the row of teeth; and a retainer pawl movably attached to the grip and also engageable with the row of teeth;

wherein when the actuator is moved from the home position towards the grip, the retainer pawl disengages from the row of teeth while the driver pawl remains engaged with the row of teeth, the movement of the actuator causes a corresponding movement of the driver pawl which causes the grip and squeeze pusher to move relative to the body in a direction from the proximal end to the dispensing end.

2. The dispenser of claim 1 wherein when the actuator is allowed to move back to the home position away from the grip, the retainer pawl engages with the row of teeth to prevent the grip and squeeze pusher to move relative to the body in a direction from the dispensing end to the proximal end, and wherein the driver pawl disengages from the row of teeth and moves to a new location where the driver pawl reengages the row of teeth.

3. A dispensing system comprising:

the dispenser of claim 1; and a pouch filled with a product to be dispensed, the pouch disposed within the interior space of the body and including a flattened shape corresponding to the asymmetric shape of the dispenser body, the pouch further comprising a spout for dispensing the product at a first end and a seal at an opposite second end;

wherein the second end of the pouch is secured to the proximal end of the body and the spout is disposed towards the dispensing end of the body; and wherein when the squeeze pusher moves relative to the body in the direction from the proximal end to the dispensing end, the squeeze pusher slides along the exterior of the pouch to apply pressure to the pouch and cause the product to exit the spout.

4. A dispensing system comprising:

the dispenser of claim 1, wherein the body further comprises an aperture at the dispensing end; and a pouch filled with a product to be dispensed, the pouch disposed within the interior space of the body and including a flattened shape corresponding to the asymmetric shape of the dispenser body, the pouch further comprising a spout for dispensing the product at a first end and a seal at an opposite second end;

wherein the second end of the pouch is positioned towards the proximal end of the body and the spout is positioned to pass through the aperture; and wherein when the squeeze pusher moves relative to the body in the direction from the proximal end to the dispensing end, the squeeze pusher applies pressure to the pouch and causes the product to exit the spout.

5. A dispenser adapted to dispense condiment from a condiment-filled pouch, the pouch having an elongated shape and a spout at a dispensing end of the pouch, the dispenser comprising:

a body comprising a proximal end, a dispensing end, opposed sides, and an opposed top and bottom defining an interior space, the interior space including an asymmetric shape wherein a height between the top and bottom is at least two times a width between the sides, and a spout aperture at the dispensing end, the spout aperture including a restrictor;

a row of teeth extending longitudinally along the body from the proximal end to the dispensing end;

a grip slidingly engaged with the body;

a squeeze pusher disposed within the interior space of the body, the squeeze pusher coupled to the grip and slidable within the interior space;

an actuator movably attached to the grip and biased to a home position away from the grip and movable from the home position towards the grip;

a drive mechanism coupled to the actuator and engageable with the row of teeth; and a retainer pawl movably attached to the grip and also engageable with the row of teeth;

wherein when the actuator is moved from the home position towards the grip, the retainer pawl disengages from the row of teeth while the drive mechanism remains engaged with the row of teeth, the movement of the actuator causes a corresponding movement of the drive mechanism which causes the grip and squeeze pusher to move relative to the body in a direction from the proximal end to the dispensing end.

* * * * *